(No Model.)

W. J. FAUL.
METHOD OF MAKING LUBRICATING CARTRIDGES.

No. 330,102. Patented Nov. 10, 1885.

Witnesses.
Emil Herter
C. E. Sundgren

Inventor.
William J. Faul
by his Attorneys
Brown & Hall

N. PETERS, Photo-Lithographer, Washington, D. C.

UNITED STATES PATENT OFFICE.

WILLIAM J. FAUL, OF NEW YORK, N. Y.

METHOD OF MAKING LUBRICATING-CARTRIDGES.

SPECIFICATION forming part of Letters Patent No. 330,102, dated November 10, 1885.

Application filed April 13, 1885. Serial No. 162,022. (No model.)

*To all whom it may concern:*

Be it known that I, WILLIAM J. FAUL, of the city and county of New York and State of New York, have invented a new and useful Improvement in the Method of Making Lubricating-Cartridges, of which the following is a specification.

My invention relates to lubricating-cartridges for journal-boxes and other bearings, which consist of lubricating material molded into the form of a stick, and which will retain a firm consistency or solidity during ordinary atmospheric temperatures, but will readily soften or fluidize on the surface exposed to wear by friction. Ordinarily such cartridges are placed in a tube or case and are fed downward by gravity against a rotating journal, the friction of the journal upon the end of the cartridge or stick serving to wear away or soften the cartridge or stick with sufficient rapidity to effectively lubricate the journal.

In the use of cartridges or lubricating-sticks of the kind described it is found that where they consist simply of grease or lubricating material it will be worn away too rapidly by the friction of the journal, and hence it has been common to provide a shell or case in which the cartridge or stick of grease is contained, and which is capable of joint reduction with the grease.

In my Letters Patent No. 214,640, dated April 22, 1879, is shown and described a cartridge composed of a shell or case made of paper, cloth, or other suitable material, and filled with grease or other lubricating material or compound, such shell or case being capable of joint reduction with the grease as they are fed in concert against the surface to be lubricated.

I have now discovered that instead of first making a shell or case of paper or other material, and then filling such shell or case with grease or other lubricating compound, the stick of grease or lubricating compound may be first molded or otherwise formed, and then have applied to its exterior surface a coating of paint or other material which will sustain the grease and will still be capable of joint reduction therewith.

To this end my invention consists in the improvement in the method of making lubricating-cartridges, which consists in first molding or otherwise producing a stick of grease or other lubricating material, and then applying to the exterior thereof a sustaining-coating which is capable of joint reduction with the cartridge or stick.

Figure 1:
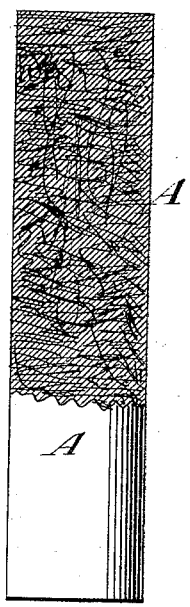
Figure 2:
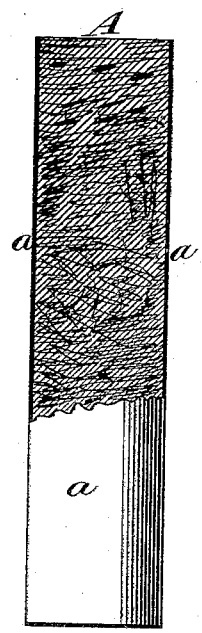

In the accompanying drawings, Figure 1 represents a cartridge or stick of grease or other lubricating material after it is molded or otherwise produced, and before any coating is applied thereto; and Fig. 2 represents such cartridge or stick after it has received its sustaining-coating.

Similar letters of reference designate corresponding parts in both figures.

A designates a stick or cartridge of grease or other lubricating material or compound, which is molded or otherwise produced, and which is usually in the form of a cylinder of considerably greater length than thickness.

In carrying out my invention I first make the stick as shown in Fig. 1, the same being destitute of any exterior coating outside the grease or lubricating material, and I then apply to the exterior of the stick or cartridge a coating, $a$, of any substance which will not readily become fluidized by heat, and which will sustain the softer grease or lubricating material and prevent a too rapid reduction thereof when the cartridge or stick is applied to lubricate a journal or bearing. This coating $a$ may be of any suitable material or substance.

The cartridge or stick of grease A, which has been first molded or otherwise produced, may have an exterior coating of paint or other semi-fluid substance applied to it with a brush, or the cartridge or stick may be dipped in a bath of such material, or the cartridge or stick may be rolled in or upon a bed of such material in order that it shall pick up and retain a sufficient quantity to form a sustaining-coating on its exterior.

By my invention I apply to the cartridge or stick of grease or lubricating material, after it is molded or otherwise produced, a coating, $a$, which will sustain the lubricating material and prevent its too rapid reduction when applied to a bearing, and which will also be reduced or worn away with the grease or lubricating material.

What I claim as my invention, and desire to secure by Letters Patent, is—

The improvement in the method of making lubricating-cartridges, consisting in first producing a stick of grease or other lubricating material, and then applying to the exterior of the stick a sustaining-coating, $a$, capable of joint reduction with the grease or lubricating material, substantially as and for the purpose herein described.

WM. J. FAUL.

Witnesses:
FREDK. HAYNES,
MATTHEW POLLOCK.